United States Patent [19]

Nathoo et al.

[11] Patent Number: 4,779,347
[45] Date of Patent: Oct. 25, 1988

[54] METHOD OF DETERMINING THE SHAPE OF A FLAT FABRIC PATTERN FOR APPLICATION TO A GENERAL CURVED SURFACE

[75] Inventors: Nazim S. Nathoo, Houston, Tex.; Thomas W. Sederberg, Orem, Utah; Prashant D. Parikh, Houston, Tex.

[73] Assignee: Shell Oil Company, Houston, Tex.

[21] Appl. No.: 83,327

[22] Filed: Aug. 10, 1987

[51] Int. Cl.⁴ ............................................. A41H 3/00
[52] U.S. Cl. ..................... 33/1 R; 33/17 R
[58] Field of Search ................... 33/1 R, 17 R, 17 A, 33/11, 15

[56] References Cited

U.S. PATENT DOCUMENTS 3,594,559 7/1971 Pemberton .
3,891,836 6/1975 Lee .
4,495,559 1/1985 Gelatt, Jr. et al. .
4,534,002 8/1985 Urban .
4,554,625 11/1985 Otten .
4,554,635 11/1985 Levine .

OTHER PUBLICATIONS

"Fiber Placement During the Forming of Continuous Fiber Reinforced Thermoplastics," A. J. Smiley and R. B. Pipes, Society of Manufacturing Engineers.

Primary Examiner—Harry N. Haroian
Attorney, Agent, or Firm—Paul I. Douglas

[57] ABSTRACT

A method is disclosed for the determination of the shape of a flat section of fabric prior to application of the fabric to a curved surface.

9 Claims, 9 Drawing Sheets

INTERPOLATE BETWEEN OLD $G_1, G_2, G_{XPM}$

CASE 4

IF
$a_{PM} < a_2$
$G_{XPM} < G_2$
THEN FIG. 23
APPLIES

FIG. 23

CASE 4

| NEW | OLD |
|---|---|
| $a_1$ | $a_1$ |
| $a_3$ | $a_2$ |
| $a_2$ | $a_{PM}$ |
| $G_3$ | $G_2$ |
| $G_2$ | $G_{XPM}$ |

INTERPOLATE BETWEEN
OLD $G_1, G_{XPM}, G_2$

LENGTHS USED IN COST FUNCTION $G_4$ IN DETERMINING GRID POINT (POINT 4) ALONG Y BIAS LINE 54

FIG. 26

LENGTHS USED IN COST FUNCTION $G_5$ IN DETERMINING THE FOURTH POINT (POINT 4) OF A LATTICE "SQUARE"

FIG. 27

METHOD OF DETERMINING THE SHAPE OF A FLAT FABRIC PATTERN FOR APPLICATION TO A GENERAL CURVED SURFACE

BACKGROUND OF THE INVENTION

The present invention relates to a method for use in determining the shape of a flat fabric pattern that will be used to cover a general curved surface.

More particularly, the method relates to shaping the perimeter of a flat fabric prior to placement of the fabric on a foam core used in manufacturing composite parts by the resin transfer molding process. It should be well recognized that the method of the present invention may be applied to determine the required shape to cut an originally flat section of fabric to cover any (curved) surface.

As applied to the resin transfer molding process, the fabric will typically consist of random or oriented fiber bundles, wherein the fibers typically comprise fiberglass filaments.

In general, it is not possible to cover free-form curved surfaces with flat fabric without wrinkling or distortion of the original parallel configuration of the fiber bundles which form the fabric. Wrinkling and excessive distortion of the fabric are not acceptable since they yield a part susceptible to undesirable stress concentrations. A method therefore needs to be developed that will predetermine the pattern of a flat fabric used to cover a curved surface, wherein fiber spacing and fabric fiber orientation remain within specified tolerances after the fabric is laid upon the curved surface.

In the paper entitled "Fiber Placement During the Forming of Continuous Fiber Reinforced Thermoplastics" authored by Anthony J. Smiley and R. Byron Pipes, presented in the Composites in Manufacturing Conference Jan. 19-22, 1987 in Anaheim, Calif. and available from the Society of Manufacturing Engineers, a computational procedure which predicts the "as formed" fiber distribution of a single ply of unidirectional fibers is presented. Unfortunately, such a discussion deals only with one fabric layer at a time, and is restricted to surfaces that are symmetric, whereas the application of fiberglass cloth to a general non-symmetrical surface involves the interaction of a minimum of two layers of fiberglass fibers stitched to one another. This publication also models its mathematical assumptions on the premise that the distance between nodes on a single fiber is held fixed, whereas when multilayered fiberglass cloth is used the separation distance between adjacent fibers changes as the fabric is draped across the curved surface.

A method therefore needs to be developed wherein a multilayer fabric may be precut to a specific shape and then draped over a curved surface without the occurrence of adverse fiber distortion or wrinkling. The perimeter of the draped fabric should also match the boundary of the surface after the fabric has been oriented in a desired direction across the surface.

SUMMARY OF THE INVENTION

In a preferred embodiment of the present invention a method for covering a surface with a section of fabric having fiber bundles comprises defining the shape of the surface and its boundary, defining the shape of a lattice to represent the defined shape of the surface and the orientation of the fabric upon the surface, thereafter defining a flat pattern having a perimeter by referencing the shape of the lattice, shaping the fabric to the shape of the flat pattern, and finally, covering the surface with the resultant shaped fabric.

It is therefore an object of the present invention to present a method wherein a fabric may be cut to precisely overlay a (curved) surface.

It is a further object of the present invention to orient the fabric's fiber bundles in a preferred direction across the surface, so as to properly reinforce the article in the direction of highest stress concentration.

It is a feature of the present invention to include the use of mathematical "cost optimization" functions to correctly predict the proper location of a series of grid points during the definition of the above mentioned lattice.

It is a further feature of the present invention to define a bias line across the defined surface, so as to correctly orient the fabric's fiber bundles in a preferred direction when draped across the curved surface.

These and other features, objects and advantages of the present invention will become apparent from the following detailed description wherein reference is made to the Figures in the accompanying drawings.

DESCRIPTION OF THE PREFERRED EMBODIMENTS

Figure 1:
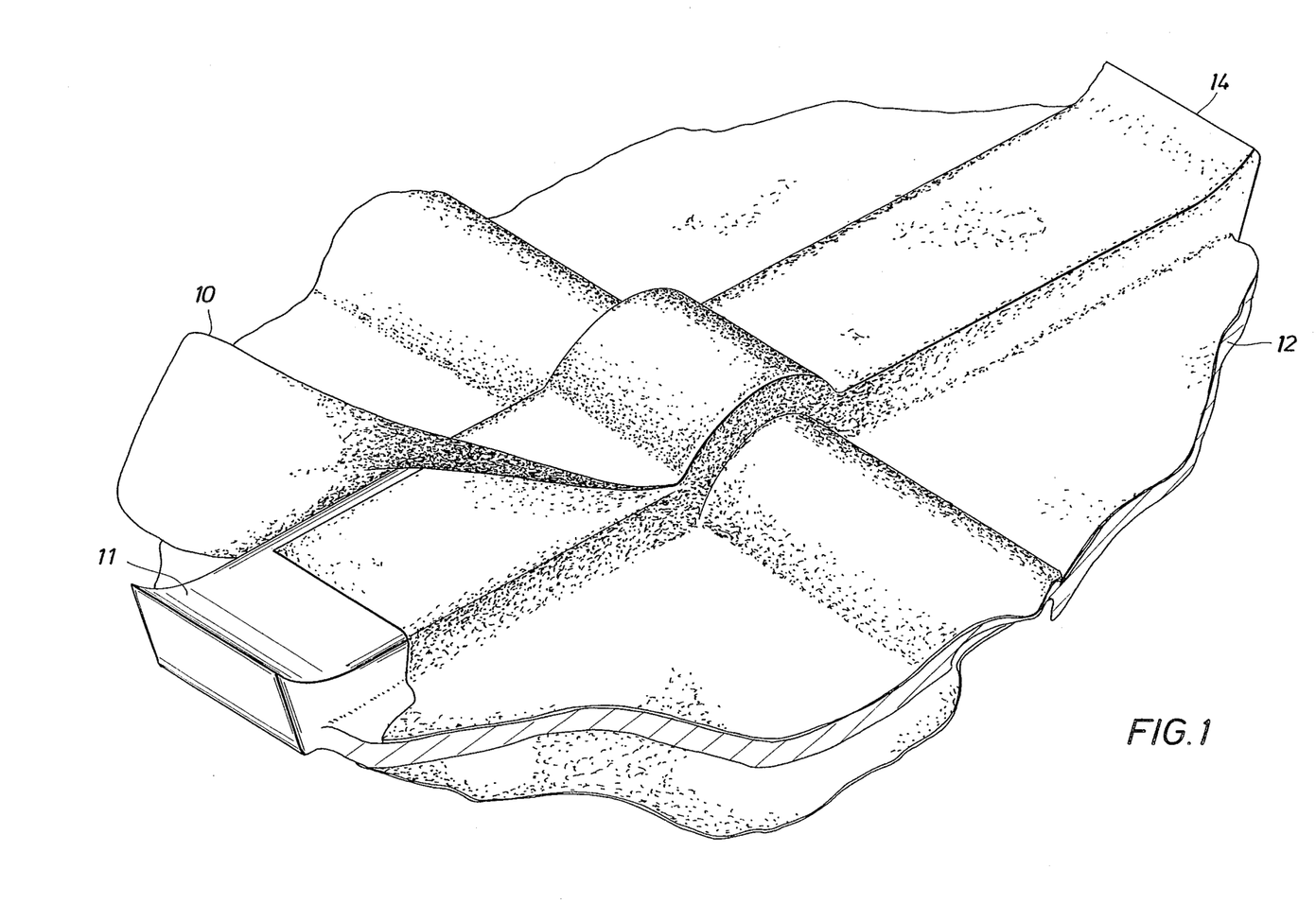
FIG. 1 is a pictorial isometric representation showing a fabric draped over the surface of a foam core.

Referring now to FIG. 1, in a typical application of the resin transfer molding process, fabric 10, typically fiberglass cloth well known to the art or roving or chopped strand matte, etc., is used in various thickness and oriented layers to cover a surface 11, such as the surface of foam core 12. Surface 11 typically will have a curvilinear surface boundary 14. As can be seen, surface 11 will typically have relatively flat surfaces intermixed with or lying adjacent curved surfaces.

Figure 2:
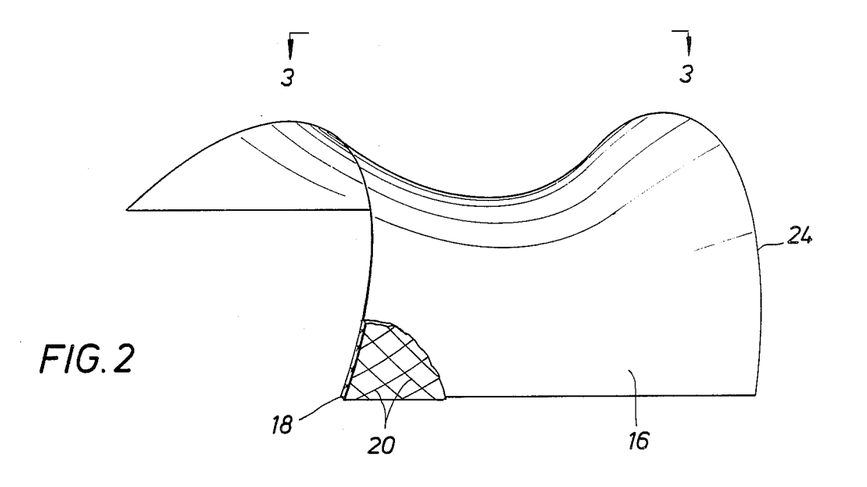
FIG. 2 is a schematic isometric pictorial representation showing a saddle-shaped surface partially covered by a fabric section.
Figure 3:
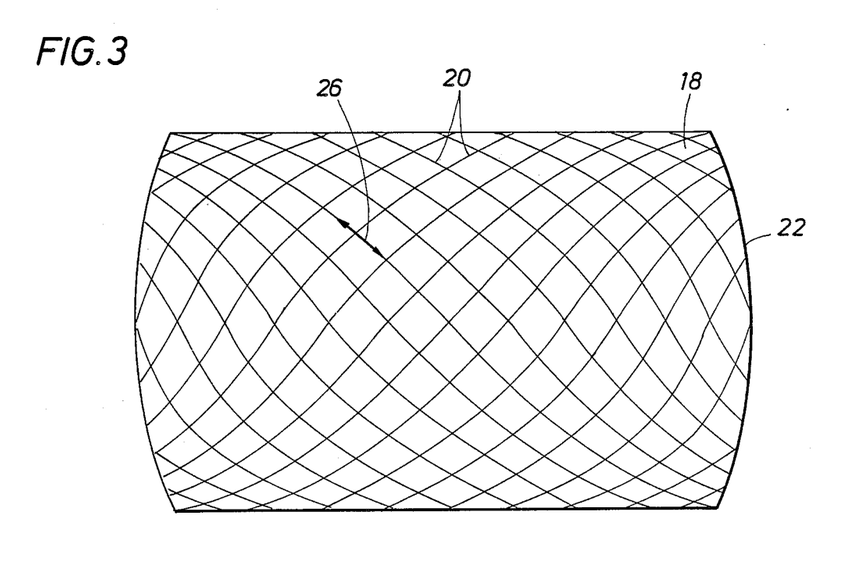
FIG. 3 is a schematic representation in top view taken along lines 3—3 of FIG. 2 showing the surface entirely covered by a fabric section.

Referring now to FIGS. 2 and 3 for a more specific example, a surface 16 shaped like a saddle is shown partially covered by a fabric section 18 having fiber bundles 20 oriented therein. It is desired to define the perimeter 22 of the fabric section 18 such that the perimeter 22 matches the surface boundary 24, when the fabric section 18 is laid upon the surface 16. The perimeter 22 should also match the surface boundary 24 when fiber bundles 20 are oriented in desired direction 26.

As can be imagined, to precisely match the shape of the perimeter 22 and the fiber bundle direction 26 relative to surface boundary 24 would be a tedious trial and error process if performed manually.

Referring now to FIGS. 4-10, the steps comprising the teachings of the present invention can now be described in a general manner. After the general discussion of FIGS. 4-10 a more specific mathematical discussion will follow.

Figure 4:
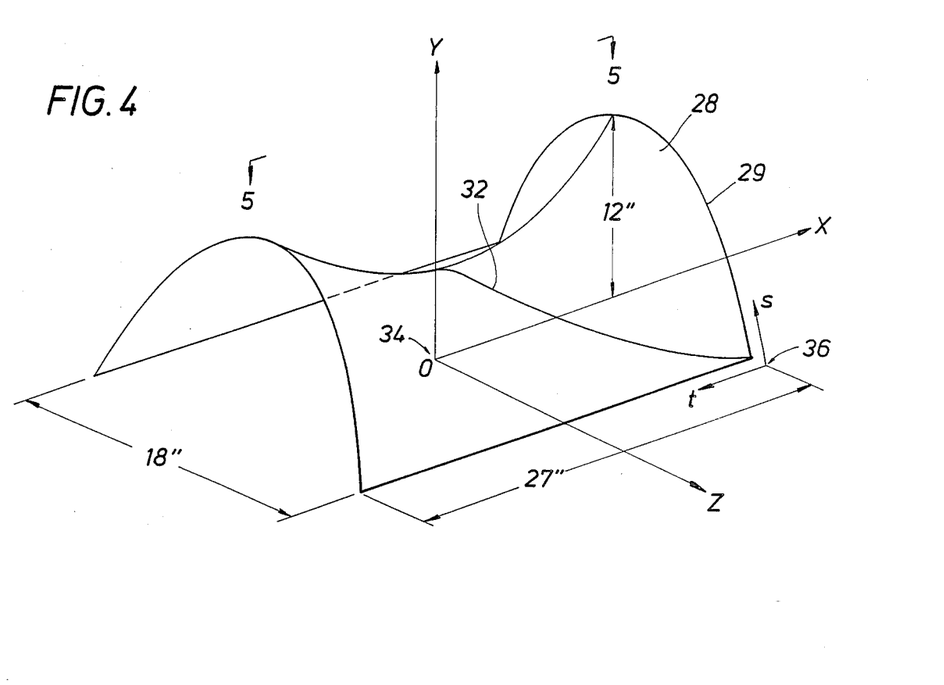
FIG. 4 is a schematic representation of the mathematically defined shape of the surface shown in FIG. 3.

Referring now to FIG. 4 a mathematically defined shape 28 of saddle-shaped surface 16 is shown. Such defined shape 28 and its boundary 29 thereof may be generated by calculation of the metrical properties of surface 16 by use, for example, of Bezier equations, as is well known to the art. An X-bias line 32 is shown defined across the surface 28. X, Y, and Z coordinates 34 are shown defined relative to surface 28 along with S, and T parameter value axes 36 as is well known to the art. For later discussion purposes dimensions are also given for the surface 16.

Figure 5:
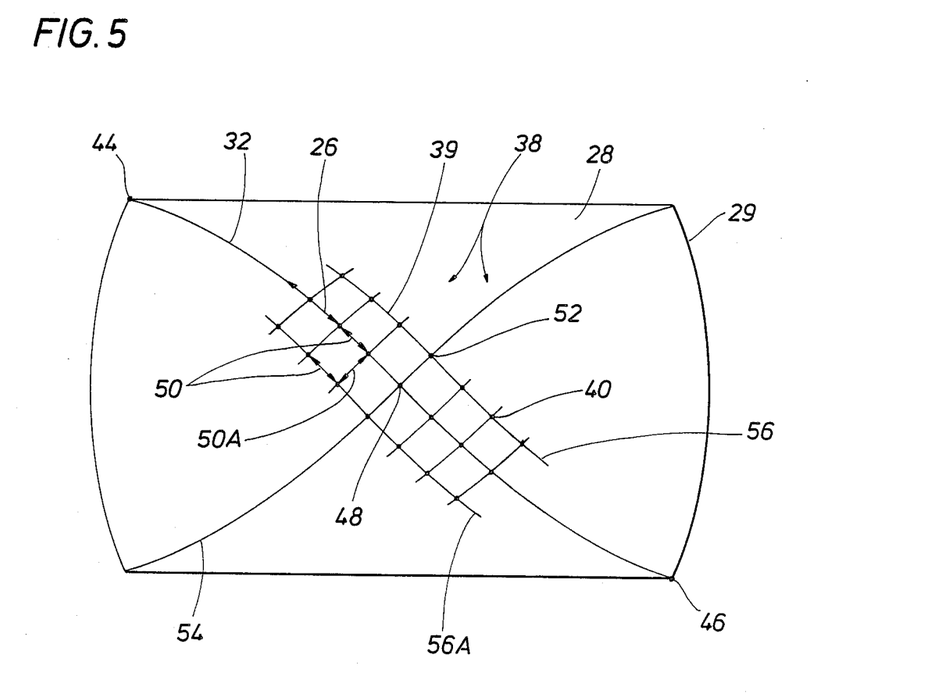
FIG. 5 is a schematic representation in top view taken along lines 5—5 of FIG. 4.

Referring now to FIG. 5, (taken along line 5—5 of FIG. 4), a portion of a lattice 38 is shown being defined in order to represent the shape 28 of surface 16 and also preferably the fabric orientation of the fabric 18 draped on surface 16. The lines 39 which form the lattice 38 represent the fibers that comprise the fabric 18 that will be draped upon the surface 16.

The first step in the definition of the lattic 38 is the definition of an X-bias line 32 in a direction coinciding with the desired direction of fiber bundle orientation 26 (FIG. 3) across surface 16. The direction of the X-bias line 32 may be defined by specification of the S, T parameter values 36 (FIG. 4) of the end points A 44 and B 46 of the X bias line.

Once the location of end points 44, 46 have been selected a curve comprising the X-bias line 32 may be defined by mathematical means to connect the end points 44, 46 in a manner so as to minimize the distance over the shape 28 between the end points 44, 46. Once the X-bias line 32 has been defined the origin 48 of the lattice 38 may be located in the center of the X bias line 32 between end points 44, 46.

Grid points 40 are then defined to further form the fabric lattice 38, the grid points 40 being positioned in spaced relation to the X bias line 32, each grid point typically being separated from each adjacent grid point by a separation distance 50, 50A approximately equal to the distance between the fiber bundles 20 (FIG. 2) but optimized mathematically as discussed later. The grid points 40 are defined along the X bias line 32 by division of the length of the X bias line 32 into segments of equal separation distance length 50, by mathematical means as discussed later in the specification.

Once the grid points 40 are defined along the X bias line 32, the location of the first grid point 52 on a Y bias line 54 may be determined, the Y bias line being defined in the lattice 38 at an orientation relative to the X bias line 32. In a typical application the Y bias line 54 will be defined normal to the X bias line at the origin 48.

Once the first grid point on the Y bias line 52 has been defined an X' bias line 56 will be defined through a row of grid points 40 positioned adjacent the X bias line 32. Each bias line, X32, Y52, X'56, etc., represents a fiber in the fabric lying on the surface 16. The lattice 38 generation process is continued with further definition of additional grid points on the Y bias line 54, the definition of additional X' bias lines 56A, each of the additional X' bias lines 56A containing one of the additional grid points 52 defined on the Y bias line 54 so as to extend the grid points 40 a specified amount beyond the boundary 29 of the defined shape 28 of the surface 16 (FIG. 2).

The lattice 38 is generated in this manner with each additional grid point spaced adjacent the last position grid point by a separation distance 50, in order to form the lattice 38 which extends beyond the boundaries of the defined surface 28.

Figure 6:
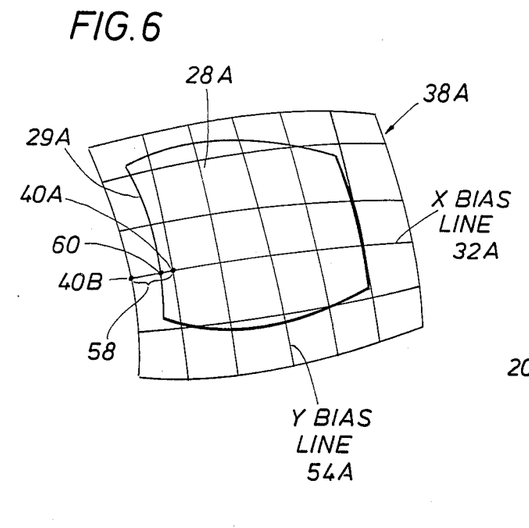
FIG. 6 is a schematic representation showing an alternate defined surface covered by a lattice.
Figure 7:
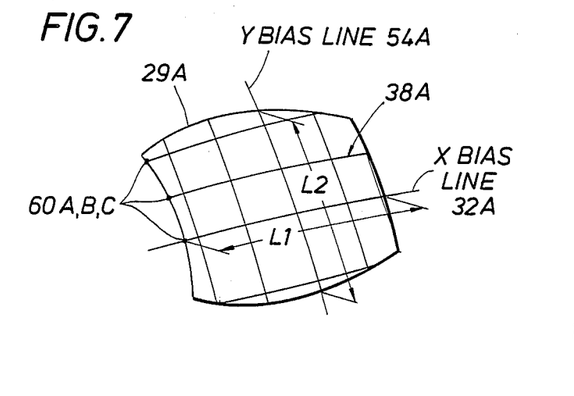
FIG. 7 is a schematic representation showing the lattice trimmed to the boundary of the defined surface.

Referring now to FIGS. 6-10 to simplify discussion the shape 28 discussed in FIGS. 2-5 will now be replaced by surface 28A in FIGS. 6 and 7.

Once lattice 38A has been defined by grid points 40A, 40B, etc. so as to extend beyond the boundary 29A of the surface 28A, the lattice 38A is confined within the boundary of the defined shape 28A by the performance of the following steps, which are well known to the art as the Sutherland-Hodgman technique and which can be found in *Principles of Interactive Computer Graphics,* Newman, W. M. and R. F. Sproull, McGraw-Hill, 1979. Each pair of adjacent grid points 40A, 40B, for example, is examined to determine if the grid points 40A, 40B straddle a boundary 29A of the defined shape 28A. For grid points 40A, 40B which do straddle the boundary 29A, a line element 58 is defined between the grid points 40A, 40B. A lattice end point 60 is then defined at the intersection of the line element 58 and the boundary 29A. In a similar manner other line elements are defined along with other lattice end points so as to redefine the lattice 38A within the lattice end points 60. As before, the lattice 38A can be seen to comprise X bias line 32A and Y bias line 54A along with other bias lines having similar orientations.

Referring now to FIG. 7, after definition of all of the lattice end points, such as for example 60A, B, C at the intersection of the lattice with the boundary 29A, the lattice 38A, now confined within the boundary 29A can be seen to include an X bias line 32A having a specific length L1 and a Y bias line 54A having a specific length L2, along with other similarly oriented bias lines.

Figure 8:
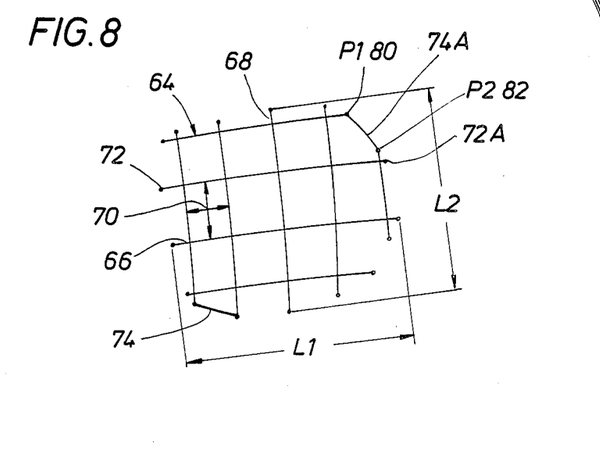
FIG. 8 is a schematic representation of a flat pattern defined after reference to the lattice dimensions shown in FIG. 7.

Referring now to FIGS. 7 and 8, flat pattern 64 may now be generated by reference to the dimensions L1 and L2 of the bias lines 32A, 54A. The length of each bias line may be computed between the lattice end points. Once the lengths have been computed the flat pattern 64 may be generated wherein the flat pattern 64 now incorporates an X bias straight line 66 having length L1 and a Y bias straight line 68 having length L2 obtained from FIG. 7. Each of the straight lines 66, 68 in FIG. 8 have lengths equal to the computed lengths of each of the bias lines shown in FIG. 7. Each straight line is again separated by a preferred separation distance 70 exactly equal to the spacing between individual fiber bundles of the fabric.

Each straight line 66, 68 can be seen to have flat pattern end points 72, 72A defined at each end thereof. In order to define the flat pattern 64 within a shaped perimeter, the flat pattern end points 72, 72A of each straight line are connected by arc segments 74, 74A for example. In this way a flat pattern 64 may be generated having a particular perimeter by reference to the relatively curvi-linear dimensions of the redefined lattice 38A in FIG. 7.

Figure 9:
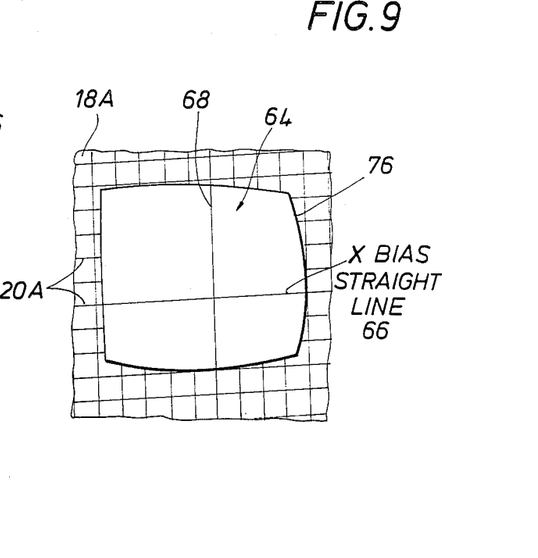
FIG. 9 is a schematic representation showing the flat pattern overlaid upon a fabric section.
Figure 10:
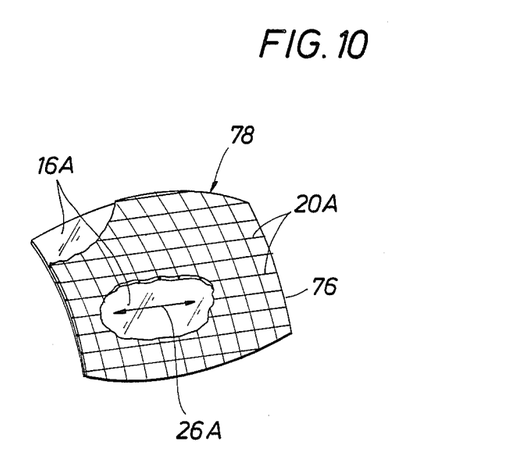
FIG. 10 is a schematic representation showing the shaped fabric overlaid or covering the desired surface.

Referring now to FIGS. 9 and 10, the flat pattern 64 having Y bias straight line 68 and X bias straight line 66 delineated thereon and a perimeter 76 formed by the continuous joiner of arc segments 74 (FIG. 8) is shown placed in an oriented manner upon fabric section 18A, fabric 18A having fiber bundles 20A. The flat pattern 64 is oriented so as to place the X bias straight line 66 in alignment with the fiber bundles 20A. Once the flat pattern 64 has been properly oriented with respect to the fiber bundles 20A the fabric section 18A is cut so as to duplicate the flat pattern 64 perimeter 76 overlaid upon the fabric 18A.

The shaped fabric 78 is cut from fabric section 18A and used to cover the surface 16A such that the fiber bundles 20A are aligned with the desired direction of fiber bundle orientation indicated by arrow 26A. In this manner any shaped fabric section 78 may be cut from fabric sections 18A in order to cover any corresponding (curved) surface 16A. In addition, the fiber bundles 20A within the shaped fabric 78 may be preferentially aligned with fiber bundle direction 26A across the surface 16A, in order to allow the fabrication of a laminated part with selected fiber bundle direction(s) in order to anticipate stress concentrations at various points in the surface of the fabricated article.

The following portion of the specification describes the mathematical considerations that are involved during the performance of the previously described method.

As mentioned earlier, the shape of a surface may be mathematically represented by use of Bezier equations, wherein as shown in equation (1)

Figure 11:
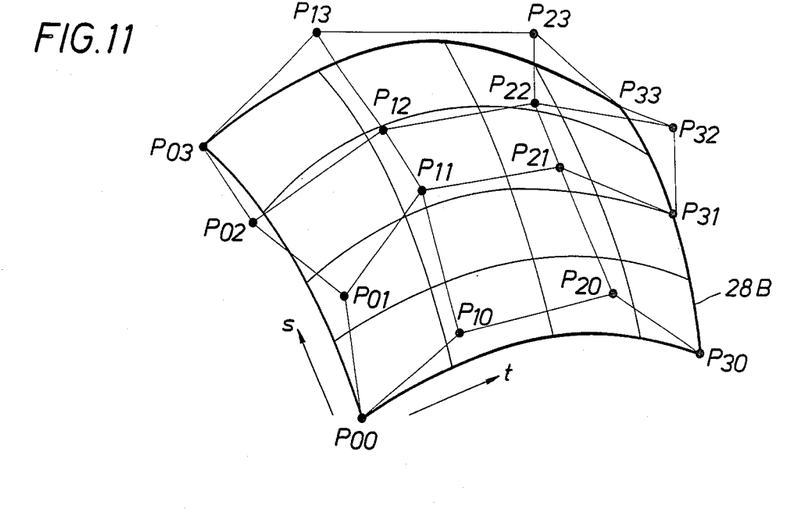
FIG. 11 is a schematic pictorial representation of a surface defined by Bezier control points.

As shown in FIG. 11, with s and t varying within the limits of 0 and 1, a four-sided free form shape 28B is defined by the location of the 16 control points given in equation (1). The directional derivatives of the above expression in equation (1) may be documented as follows:

$$\frac{\partial X(s,t)}{\partial s} = [3s^2 \ 3s(1-3s) \ 3(1-3s)(1-s) \ -3(1-s)^2] \begin{bmatrix} P_{33} & P_{23} & P_{13} & P_{03} \\ P_{32} & P_{22} & P_{12} & P_{02} \\ P_{31} & P_{21} & P_{11} & P_{01} \\ P_{30} & P_{20} & P_{10} & P_{00} \end{bmatrix} \begin{Bmatrix} t^3 \\ 3t^2(1-t) \\ 3t(1-t)^2 \\ (1-t)^3 \end{Bmatrix} \quad (2)$$

$$\frac{\partial X(s,t)}{\partial t} = [s^3 \ 3(1-s)s^2 \ 3(1-s)^2 s \ (1-s)^3] \begin{bmatrix} P_{33} & P_{23} & P_{13} & P_{03} \\ P_{32} & P_{22} & P_{12} & P_{02} \\ P_{31} & P_{21} & P_{11} & P_{01} \\ P_{30} & P_{20} & P_{10} & P_{00} \end{bmatrix} \begin{Bmatrix} 3t^2 \\ 3t(1-3t) \\ 3(1-3t)(1-t) \\ -3(1-t)^2 \end{Bmatrix} \quad (3)$$

These are required in the computation of derivatives of cost functions and of angles subtended by grid lines.

By use of the above equations the actual surface 16 shown in FIG. 2 can be mathematically defined as shown in FIG. 4. The defined shape 28 can be seen to have its surfaces and boundaries constructed of parabolic curves. The implicit equation of this defined shape 28 is given by:

$$z^2 = \frac{81}{(x^2 + 182.25)} [-30.375 y + x^2 + 182.25] \quad (4)$$

where
$-31.5 < x < 13.5$
$-9 < z < 9$
$0 < y < 12$

The above implicit representation can be converted to a parametric representation of the form $$X = X(x,y,z) \quad (5)$$

where
$x = 13.5 - 27t$
$y = 48s(1-s)(1-2t+2t^2)$
$z = 9 - 18s$
and $0 < s < 1, \ 0 < t < 1$ The Bezier representation results in the control points assuming the form $$\begin{bmatrix} P_{33} & P_{23} & P_{13} & P_{03} \\ P_{32} & P_{22} & P_{12} & P_{02} \\ P_{31} & P_{21} & P_{11} & P_{01} \\ P_{30} & P_{20} & P_{10} & P_{00} \end{bmatrix} = \begin{bmatrix} -13.5 & -13.5 & -13.5 & -13.5 \\ -4.5 & -4.5 & -4.5 & -4.5 \\ 4.5 & 4.5 & 4.5 & 4.5 \\ 13.5 & 13.5 & 13.5 & 13.5 \end{bmatrix} \vec{i} +$$

$$X(s,t) = [s^3 \ 3(1-s)s^2 \ 3(1-s)^2 s \ (1-s)^3] \begin{bmatrix} P_{33} & P_{23} & P_{13} & P_{03} \\ P_{32} & P_{22} & P_{12} & P_{02} \\ P_{31} & P_{21} & P_{11} & P_{01} \\ P_{30} & P_{20} & P_{10} & P_{00} \end{bmatrix} \begin{Bmatrix} t^3 \\ 3t^2(1-t) \\ 3t(1-t)^2 \\ (1-t)^3 \end{Bmatrix} \quad (1)$$

$0 < s < 1$
$0 < t < 1$ $$\left[\begin{array}{cccc} 0 & 16 & 16 & 0 \\ 0 & 16/3 & 16/3 & 0 \\ 0 & 16/3 & 16/3 & 0 \\ 0 & 16 & 16 & 0 \end{array}\right] \overrightarrow{j} + \left[\begin{array}{cccc} -9 & -3 & 3 & 9 \\ -9 & -3 & 3 & 9 \\ -9 & -3 & 3 & 9 \\ -9 & -3 & 3 & 9 \end{array}\right] \overrightarrow{k}$$

Once the surface 16 has been converted by mathematical means to defined shape 28 it is then necessary to meet the constraints imposed by the fabric section 18 fiber bundles 20 during the placement of the fabric lattice grid points on the shape 28. The stitches that hold the fiber bundles 20 together permit different amounts of change in separation distance 50, 50A (FIG. 5) for the orthogonal directions as the fabric is laid upon a curved surface. In other words the fiber bundles 20 displace relative to one another as the fabric section 18 is laid upon the surface 16. This change in separation distance 50, 50A is typically less than 25 percent.

Furthermore, it is probably not practical to permit the fiber bundles 20 of separate layers to get closer together when laid upon the surface 16 than in their original flat configuration when stored on the supply roll. These spacing criteria result in a lower and an upper bound on the spacing of the fiber bundles 20. Also note that the stitches applied to tie the intersections of fiber bundles together is such that an original square grid on the flat fabric section 18 can shear and assume the shape of a parallelogram. In some areas of a highly curved surface this would cause the fiber bundles 20 to come closer to one another.

As an initial starting point for the mathematical consideration of the spacing of the fiber bundles 20 relative to one another, an optimization procedure was selected to attempt to maintain the mathematical spacing as close to the separation distance 50, 50A as possible. It should be understood that the fiber bundles 20 and layers of fiber bundles are held in place by stitches that permit limited movement of the fiber bundles with respect to one another. This permits the spacing between fiber bundles 20 to distort which permits the fabric to conform to the surface upon which it is placed. The method of the present invention is directed to fabrics with two layers of mutually orthogonal fiber bundles 20 such as either a zero degree/90 degree fabric or a 45 degree/45 degree fabric as is well known to the art. It should be well recognized that the method of the present invention may be easily extended to fabric layers with more than two layers.

The optimization scheme used in the method of the present invention is a Davidon-Fletcher-Powell method, set forth in "A Rapidly Convergent Descent Method for Minimization," Fletcher, R. and M. J. D. Powell, *Computer Journal*, Vol. 6, 1963, pp. 163-168. coupled with an accurate one dimensional gradient search method. The optimization method will be used to minimize certain scalar functions such as to define the curve connecting the end points of the X bias line 32, during the definition of the grid point spacing along the X bias line, during the determination of the first grid point 52 on the Y bias line 54, and during the definition of an X' bias line 56.

Generally stated, the optimization problem deals with determining the value of an n-vector x ($x_1, x_2 \ldots x_n$) such that a scalar (cost) function G(x) is minimized. It is assumed that the derivatives $G_x(x)$ exist for all x in the range of interest. The steps involved in the procedure are:

1. Estimate starting values for x. Compute G(x) and $G^T_x(x)$
2. Compute a change $\Delta x$ using $$\Delta x = -\alpha H G_x^T \tag{6}$$

along with a one-dimensional search to determine $\alpha$ which minimizes G in the $-HG_x^T$ direction. H is a positive-definite, symmetric matrix described below and initially chosen as the identity matrix. The search yields the new function value $\bar{G}$.

3. Compute a new gradient $\bar{G}_x^T$ and form the difference $\Delta \bar{G}^T_x = \bar{G}^T_x - G^T_x$. Then compute a new H as $$H = H + \frac{\Delta x \, \Delta x^T}{\Delta x^T \Delta G_x^T} - \frac{H \, \Delta G_x^T \, \Delta G_x H}{\Delta G_x H \, \Delta G_x^T} \tag{7}$$

4. The process is repeated until the norm of $G_x(x)$ is less than a specified tolerance. This implies that the derivatives of the scalar function G(x) with respect to x are as close to zero as prescribed.

The optimization process has been applied to four different steps in the development of the lattice 38, 38A. In each case, the scalar cost function G to be minimized has been different.

The one-dimensional search to determine $\alpha$ which minimizes G in the $-HG_x^T$ direction may be performed as follows:

Objective: Minimize $I = G(x)$ — unconstrained case.

The direction $\delta x$ of the gradient search is given by the negative gradient direction, that is:

$$\delta x = -\alpha G_x^T(x) \tag{8}$$

where, in the general case, $G_x(x) = [G_{x1} G_{x2} \ldots G_{xN}]$

It is necessary to determine how far ($\alpha$) to move in the gradient direction such that $G[x_o - \alpha G^T_{xo}]$ is a minimum. The program that has been developed combines a bracketing and a second order (parabolic) curve fitting procedure to arrive at a minimum.

Figure 12:
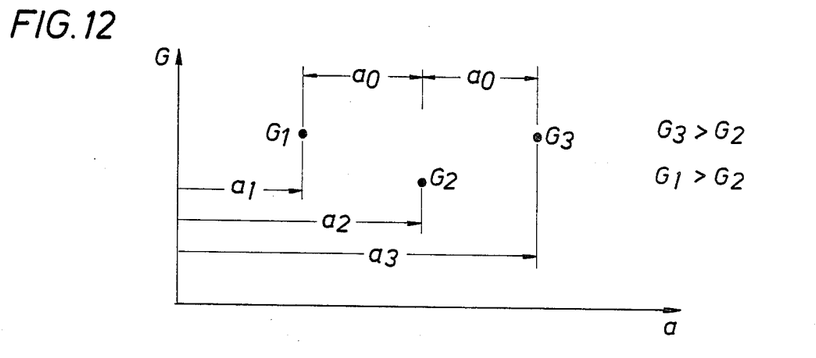
FIGS. 12-24 are graphical representations used to determine how far to move in a gradient direction in order to minimize an optimization function.

Initially, given $x_1 = x_o$, $G_1 = G(x_o)$, $G_{xo} = G_x(x_o)$ and a step size $\alpha_o$, a second point $x_2 = x_1 - \alpha G^T_{xo}$ (where $\alpha = \alpha_o$) and $G_2 = G(x_2)$ are calculated. If $G_2 > G_1$ then the step size $\alpha_o$ is reduced (say, halved) and $x_2$ and $G_2$ evaluated again and the procedure repeated until a step size $\alpha_o$ is determined such that $G_2 < G_1$. A third point $x_3 = x_1 - \alpha G^T_{xo}$ (where $\alpha \equiv \alpha + \alpha_o$) is obtained and $G_3 = G(x_3)$ is calculated. If $G_3 < G_2$, the iterative process is continued until $G[x_1 - k\alpha_o G^T_{xo}] > G[x_1 - (k-1)\alpha_o G^T_{xo}]$ where k=integer. This inherently implies $G[x_1 - (k-1)\alpha_o G^T_{xo}] < G[x_1 - (k-2)\alpha_o G^T_{xo}]$. This results in an "up-down-up" situation as shown in FIG. 12. The last point is labeled G3, the two immediately previous ones G2 and G1.

In FIG. 12, $$G_3 = G[x_1 - k\alpha_o G^T_{xo}] \quad \alpha_3 = k\alpha_o$$

$$G_2 = G[x_1 - (k-1)\alpha_o G^T_{xo}] \quad \alpha_2 = \alpha_3 - \alpha_o$$

$$G_1 = G[x_1 - (k-2)\alpha_o G^T_{xo}] \quad \alpha_1 = \alpha_3 - 2\alpha_o$$

The above scaling procedure has resulted in the bracketing of the minimum. Next, two conditions on the ratio $$\frac{\alpha^2 - \alpha^1}{\alpha^3 - \alpha^1}$$

are checked as shown later. If satisfied, a parabola $G_P = P\alpha^2 + Q\alpha + R$ is passed through the three values of $\alpha$ obtained above and the value of $\alpha$ where the parabola has its minimum is denoted by $\alpha_{PM}$ and is given by $$\frac{dG_P}{d\alpha} = 0;$$

$\alpha_{PM} = -Q/2P$.

P, Q and R are obtained from the solution of $$G_1 = P(\alpha_1)^2 + Q(\alpha_1) + R$$
$$G_2 = P(\alpha_2)^2 = Q(\alpha_2) + R \qquad (9)$$
$$G_3 = P(\alpha_3)^2 + Q(\alpha_3) + R$$

which results in $$P = \frac{1}{(\alpha_3 - \alpha_2)} \left[ \frac{G_3 - G_1}{\alpha_3 - \alpha_1} \frac{G_2 - G_1}{\alpha_2 - \alpha_1} \right] \qquad (10)$$

$$Q = \frac{G_2 - G_1}{\alpha_2 - \alpha_1} - (\alpha_2 + \alpha_1) P$$

$$R = G_1 - \alpha_1^2 P - \alpha_1 Q$$

and $\alpha_{PM} = -Q/2P$

Figure 13:
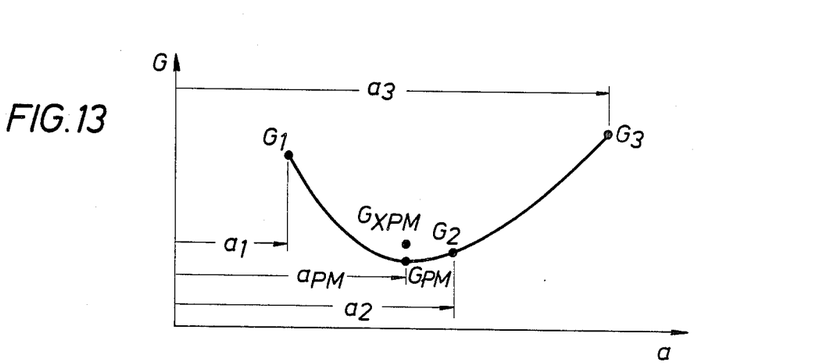

Referring now to FIG. 13, $x_{PM} = x_1 - \alpha_{PM} G^T_{xo}$ is evaluated and also $G_{xPM} = G(x_{PM})$; In addition, $G_{PM} = P(\alpha_{PM})^2 + Q(\alpha_{PM}) + R$ is evaluated.

If $\left| \frac{G_{xPM} - G_{PM}}{G_{xPM}} \right| < EPSS \quad EPSS \simeq 10^{-6}$ with $G_{xPM} > EPSO \quad EPSO \simeq 10^{-6}$ (EPSS and EPSO being dimensionless tolerance criteria.)

If $|G_{xPM} - G_{PM}| < EPSS$ with $G_{xPM} < EPSO$ then the solution has converged.

Figure 14:
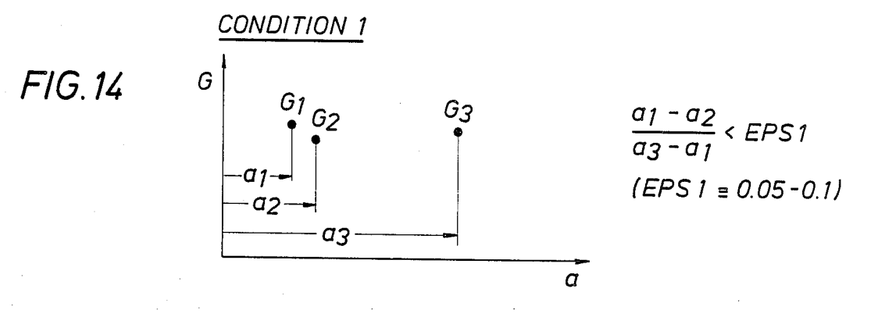
Figure 15:
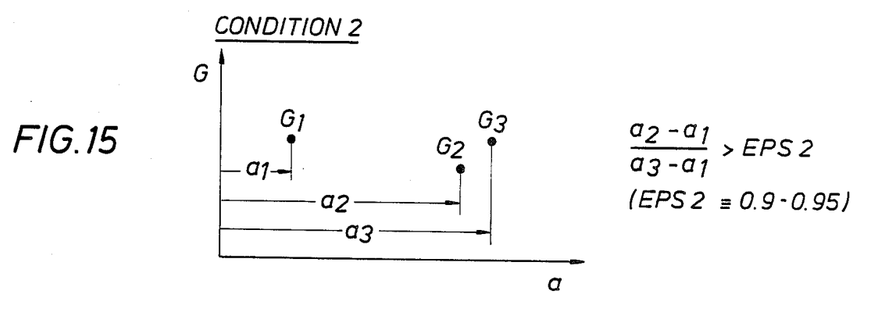
Figure 16:
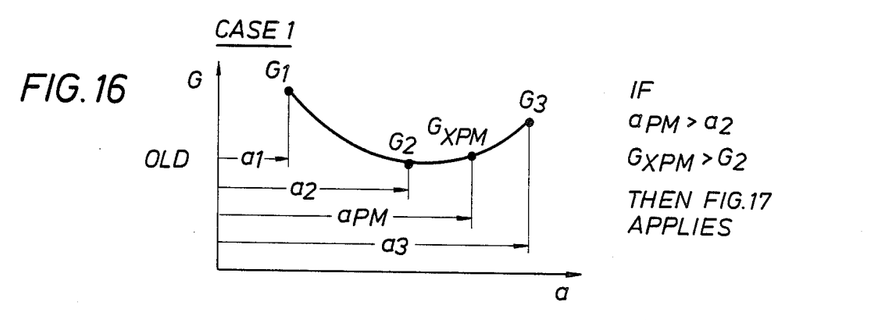
Figure 17:
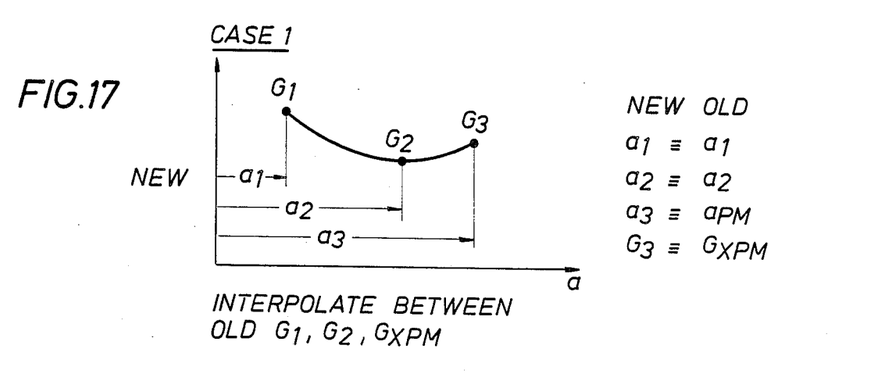
Figure 18:
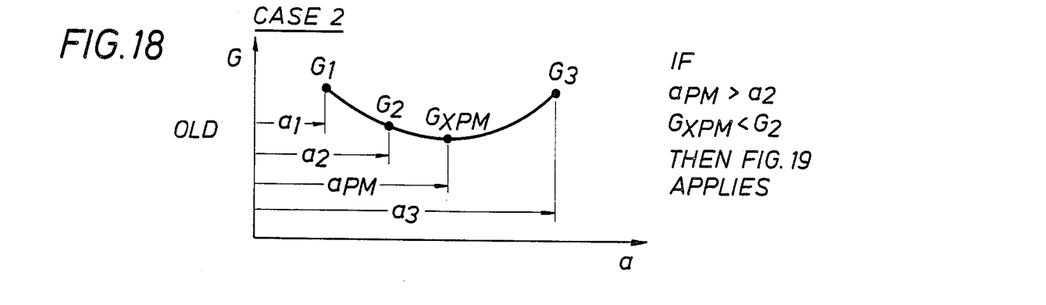
Figure 19:
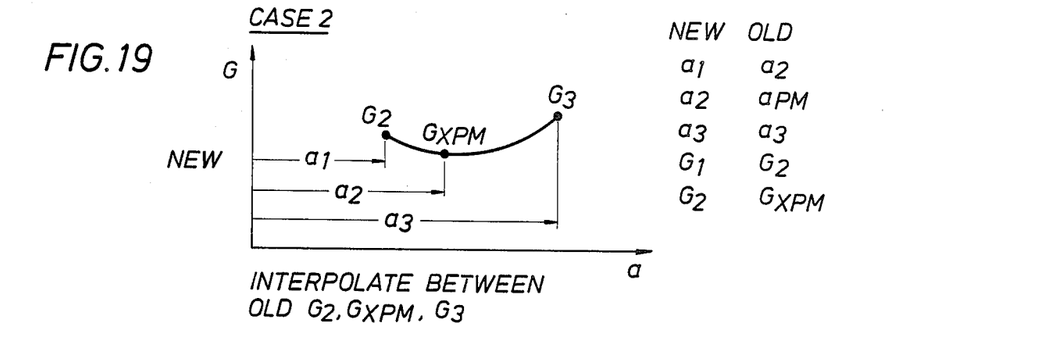
Figure 20:
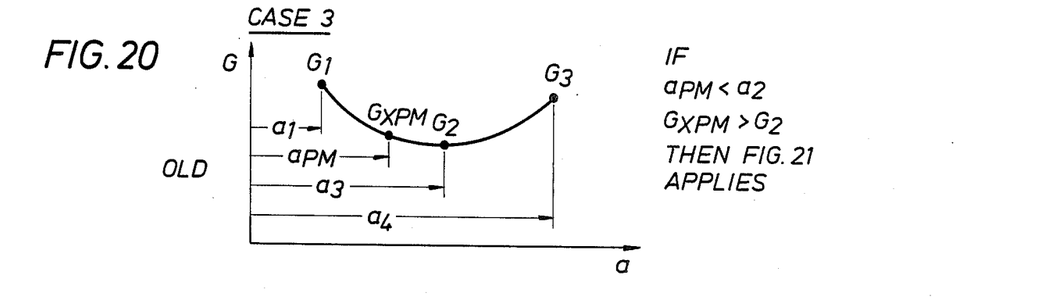
Figure 21:
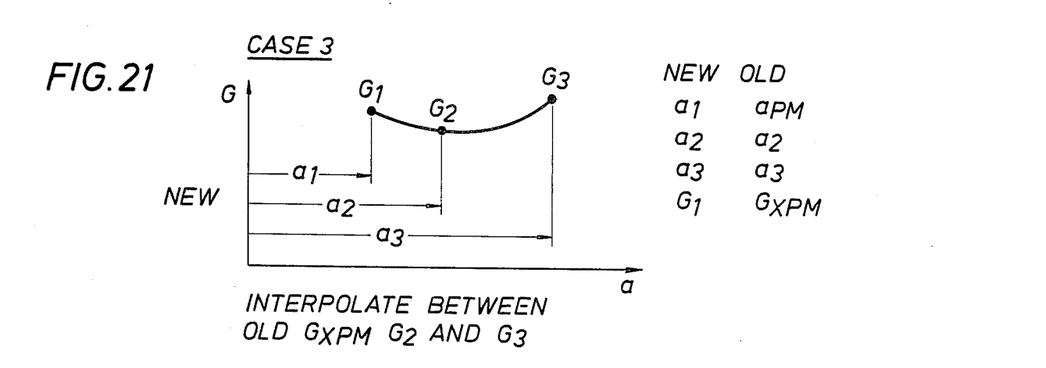
Figure 22:
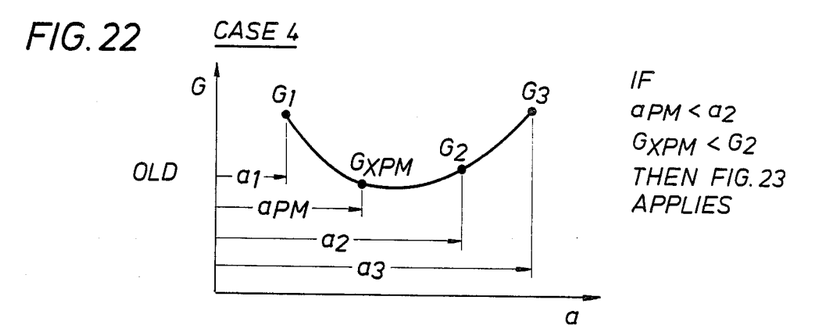
Figure 23:
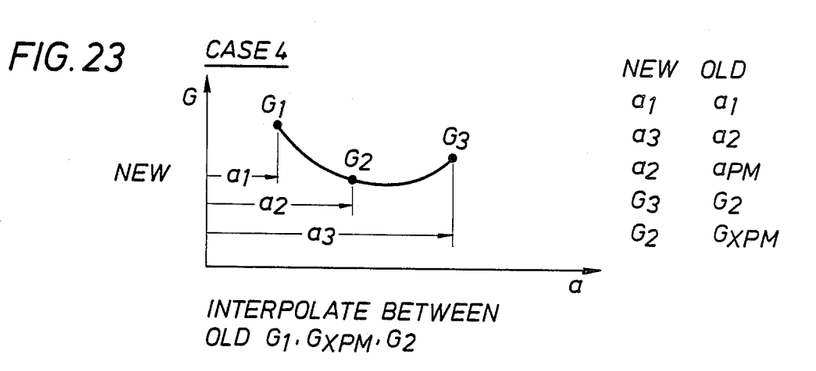

If the solution has not converged, then the parabolic interpolation is repeated after choosing 3 of the 4 points ($\alpha_1, \alpha_2, \alpha_3$ and $\alpha_{PM}$) as presented in FIGS. 14–15. Using the three points the same check is carried out to determine if $\alpha_1, \alpha_2, \alpha_3$ have developed either one of the conditions shown in FIGS. 14 and 15. The conditions shown in FIGS. 14 and 15 would not occur after the very first interpolation because $\alpha_1, \alpha_2,$ and $\alpha_3$ are equidistant, but can conceivably occur in subsequent iterations. Note that EPS1 in FIG. 14 is a dimensionless tolerence criteria in the range of 0.05–0.10 and EPS2 in FIG. 15 is a dimensionless tolerance criteria in the range of 0.90–0.95.

If condition 1 of FIG. 14 applies, then retain points G1 and G2 and reobtain point G3 as follows:

Let $\alpha_o = \alpha_o^N = \alpha_2 - \alpha_1$ and calculate the position of point G3 as follows.

Let $\alpha_3^N = \alpha_2 + \alpha_o^N$. Then $xN = x_i - \alpha_3^N G^T_{xo}$. If $G(xN) = G_3 > G_2$ then interpolation continues with evaluation of $\alpha_{PM}$. If $G_3 < G_2$, then $\alpha_3^N = \alpha_3^N + \alpha_o$ and the procedure is repeated until $G_3 > G_2$.

If condition 2 of FIG. 15 applies, then retan points G2, G3, and reobtain point G1 as follows:

Let $\alpha_1^N = \alpha_2 - (\alpha_3 - \alpha_2) = \alpha_2 - \alpha^N_o$

Then $xN = x_1 - \alpha^N_1 - G^T_{xo}$

If $G(xN) = G_1 > G_2$ then interpolation continues with the evaluation of $\alpha_{PM}$. If $G(xN) < G_2$ then $\alpha^N_1 \equiv \alpha^N_1 - \alpha^N_o$ and $G(xN)$ is reevaluated and the iteration continued until $G(xN) > G_2$ whereupon the "up-down-up" situation is restored and interpolation is continued with the evaluation of $\alpha_{PM}$.

If $\frac{\alpha_2 - \alpha_1}{\alpha_3 - \alpha_1} > EPS1$ and $\frac{\alpha_2 - \alpha_1}{\alpha_3 - \alpha_1} < EPS2$, then the program continues with the evaluation of P, Q, R, etc.

Figure 24:
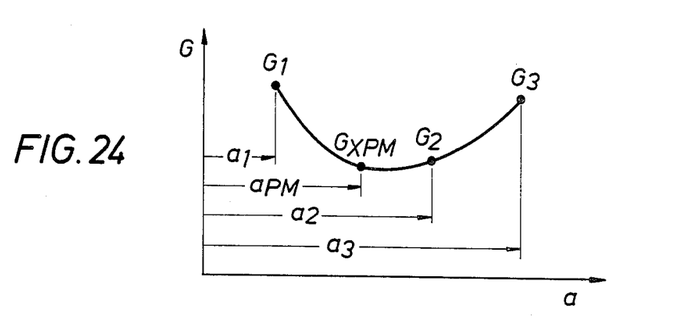

The four possible cases that arise and appropriate action to be taken are shown in FIGS. 16–23. Hence, a general situation, as shown in FIG. 24, is obtained. In this case, however, $\alpha_2 - \alpha_1 \neq \alpha_3 - \alpha_2$ as was the case in the first parabolic interpolation. The evaluation of $\alpha_{PM}$ remains unchanged, i.e., $\alpha_{PM} = -Q/2P$ and P, Q and R are obtained using Equation (10) with the present values of $\alpha$s.

Once again, the ratio $$\frac{\alpha^2 - \alpha^1}{\alpha^3 - \alpha^1}$$

is checked, P, Q, R and $\alpha_{PM}$ are calculated and convergence checked. The points are updated and returned to the main program where the norm of $G_x$ is calculated and if less than the specififed tolerance, the program stops.

The optimization process may first be used during the definition of the curve which connects the end points A44, B46, respectively, of the X bias line 32. In other words, the X bias line 32 may be tightly fitted across the defined shape 28 between end points 44, 46 in the following manner. To obtain starting points for the optimization function, an iterative procedure is employed to divide the X bias line 32 into Ngrid equal segments in parametric space. Ngrid is chosen such that the product of Ngrid and separation distance 50 is greater than the length of the bias line 32 from the origin 48 to one end point 44 or 46. The assumption is made that the final value of parameter pair S, T indicates a grid point 40 that lies on the X bias line 32 outside of the boundary of the surface 28.

The scalar function to be minimized is:

$$G_1 = G_1(x) = \{\Delta l_1 + \Delta l_2 + \ldots \Delta l_j\} \qquad (11)$$

where $\Delta l_1$ = distance of first segment

.
.
.

$\Delta l_j$ = distance from $j - 1^{th}$ point to the bias line end point 44 or 46. The $j^{th}$ point is temporarily defined as the end point.

$x^T \equiv [s_1\ t_1\ s_2\ t_2 \ldots s_j\ t_j]$ $\equiv 2 \times$ Ngrid vector This step results in the minimum distance between the origin 48 and one end point 44 or 46 of the bias line 32. As may be deduced, there will be $j-1$ segments of separation distance 50, 50A length, hereinafter "SD", and one segment of length separation distance *, hereinafter "SD*", $= G_1 - (j-1)$ (SD). Next, each of the $j-1$ pairs of parameter values must be selected such that the segments are indeed of SD length, except for the last one which is of length SD*. For this to be achieved, the following function $G_3$ has to be minimized:

$$G_3 = G_1 + G_2$$

where $$G_2 = G_2(x) = \qquad (12)$$

$$\left[ \left( \frac{\Delta l_1}{SD} - 1 \right)^2 + \left( \frac{\Delta l_2}{SD} - 1 \right)^2 + \ldots \right.$$

$$\left. + \left( \frac{\Delta l_{j-1}}{SD} - 1 \right)^2 + \left( \frac{\Delta l_j}{SD^*} - 1 \right)^2 \right]$$

This minimization will cause $G_1$ to approach the desired shortest length across shape 28 and $G_2$ to approach zero.

The derivatives of the cost functions $G_1$ and $G_2$ with respect to X are obtained as follows:

$$G_1 = G_1 = \{\Delta l + \ldots \Delta l_j\} \qquad (13)$$

where $$\Delta l_i = \{\Delta x^2_i + \Delta y^2_i + \Delta z^2_i\}^{\frac{1}{2}} \qquad (14)$$

and $\Delta x = x_i - x_{i-1}$ $\Delta y_i = y_i - y_{i-1}$ $\Delta z_i = z_i - z_{i-1}$ Similarly $\Delta l_{i+1} = \{\Delta x^2_{i+1} + \Delta y^2_{i+1} + \Delta z^2_{i+1}\}^{\frac{1}{2}}$ and $\Delta x_{i+1} = x_{i+1} - x_i$ $\Delta y_{i+1} = y_{i+1} - y_i$ $\Delta z_{i+1} = z_{i+1} - z_i$ Therefore, $$\frac{\partial G_1}{\partial s_i} = \frac{\partial \Delta l_i}{\partial s_i} + \frac{\partial \Delta l_{i+1}}{\partial s_i}\quad i = 1 \ldots j-1 \qquad (15)$$

$$\frac{\partial G_1}{\partial t_i} = \frac{\partial \Delta l_i}{\partial t_i} + \frac{\partial \Delta l_{i+1}}{\partial t_i}\quad i = 1 \ldots j-1$$

Now, $$\frac{\partial \Delta l_i}{\partial s_i} = \frac{1}{\Delta l_i} \left[ \Delta x_i \frac{\partial \Delta x_i}{\partial s_i} + \right. \qquad (16)$$

$$\left. \Delta y_i \frac{\partial \Delta y_i}{\partial s_i} + \Delta z_i \frac{\partial \Delta z_i}{\partial s_i} \right]$$

$$\frac{\partial \Delta l_{i+1}}{\partial s_i} = \frac{1}{\Delta l_{i+1}} \left[ \Delta x_{i+1} \frac{\partial \Delta x_{i+1}}{\partial s_i} + \right.$$

$$\left. \Delta y_{i+1} \frac{\partial \Delta y_{i+1}}{\partial s_i} + \Delta z_{i+1} \frac{\partial \Delta x_{i+1}}{\partial s_i} \right]$$

Similar expressions can be written for the parameter t. Finally, from equation (14)

$$\frac{\partial \Delta x_i}{\partial s_i} = \frac{\partial x_i}{\partial s_i}\ ;\ \frac{\partial \Delta y_i}{\partial s_i} = \qquad (17)$$

$$\frac{\partial y_i}{\partial s_i}\ ;\ \frac{\partial \Delta z_i}{\partial s_i} = \frac{\partial z_i}{\partial s_i}$$

$$\frac{\partial \Delta x_{i+1}}{\partial s_i} = -\frac{\partial x_i}{\partial s_i}\ ;\ \frac{\partial \Delta y_{i+1}}{\partial s_i} =$$

$$-\frac{\partial y_i}{\partial s_i}\ ;\ \frac{\partial \Delta z_{i+1}}{\partial s_i} = -\frac{\partial z_i}{\partial s_i}$$

The derivative of x, y and z with respect to s and t are documented in Equations (2) and (3).

$$G_z = \left[ \left( \frac{\Delta l_1}{SD} - 1 \right)^2 + \left( \frac{\Delta l_2}{SD} - 1 \right)^2 + \ldots + \qquad (18) \right.$$

$$\left. \left( \frac{\Delta l_{i-1}}{SD} - 1 \right)^2 + \left( \frac{\Delta l_i}{SD^*} - 1 \right)^2 \right]$$

$$\frac{\partial G_2}{\partial s_i} = 2 \left[ \frac{1}{SD} \left( \frac{\Delta l_i}{SD} - 1 \right) \frac{\partial}{\partial s_i} (\Delta l_i) + \right.$$

$$\left. \frac{1}{SD} \left( \frac{\Delta l_{i+1}}{SD} - 1 \right) \frac{\partial}{\partial s_i} (\Delta l_{i+1}) \right]$$

$$\frac{\partial G_2}{\partial t_i} = 2 \left[ \frac{1}{SD} \left( \frac{\Delta l_i}{SD} - 1 \right) \frac{\partial}{\partial t_i} (\Delta l_i) + \right.$$

$$\left. \frac{1}{SD} \left( \frac{\Delta l_{i+1}}{SD} - 1 \right) \frac{\partial}{\partial t_i} (\Delta l_{i+1}) \right]$$

The derivatives of $\Delta l$ with respect to s and t are obtained as shown in equations (16) and (17). The only deviation to equation (18) is when the following terms are evaluated:

$$\frac{\partial}{\partial s_{i-1}}(\Delta l_{i-1}) \text{ and } \frac{\partial}{\partial t_{i-1}}(\Delta l_{i-1})$$

The second part of these expressions expressions has $1/SD^*$ rather than $1/SD$. It may be recalled that $G_3=G_1+G_2$ and $G_3$ is minimized to obtain and divide the x axis into optimized equal segments.

Once $G_1$ is known, the $j^{th}$ point is reassigned its original value and the remaining (ngrid-j) points 40 are redivided into intervals of SD. The other portion of the X bias line 32 from the origin 48 to the other end point 46, or 44 is divided into optimized segments in a similar manner.

Figure 25:
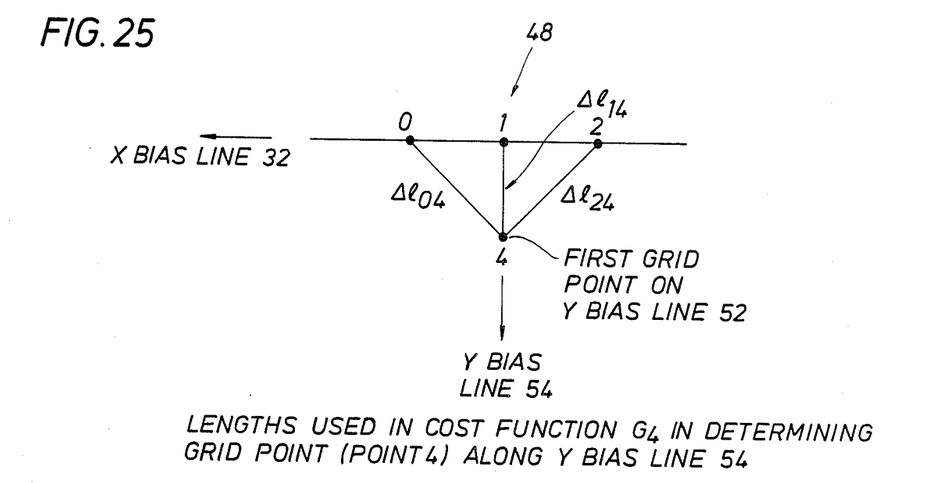
FIG. 25 is a graphical representation which shows the lengths used in a cost function for determination of a first grid point along Y Bias Line 54.

The next step is to determine the location of the first grid point on the Y bias line 52. For these points, the function to be minimized is:

$$G_4 = G_4(x) = \left[ \left( \frac{\Delta l_{04}}{\sqrt{2}\ SD} - 1 \right)^2 + \left( \frac{\Delta l_{14}}{SD} - 1 \right)^2 + \left( \frac{\Delta l_{24}}{\sqrt{2}\ SD} - 1 \right)^2 \right] \quad (19)$$

where $\Delta l_{14}$ and $\Delta l_{24}$ are shown in FIG. 25.

$$x = [s_4\ t_4]$$
$$= \text{parameter values of the point to be determined.}$$

This function attempts to keep the point "centered" as it attempts to maintain the spacing equal to separation distance 50, 50A, "SD".

The starting point for this optimization calculation is obtained by:

$$s_4 = s_1 + t_1 - t_o$$

$$t_4 = t_1 + s_o - s_1$$

if it is the first point 52 on the y bias line 54.
For subsequent points, $$s_4 = 2s - s'_4$$

$$t_4 = 2t_1 - t'_4$$

where $s'_4$ and $T'_4$ are parameters of points obtained by the optimizer in the previous step.

Figure 26:
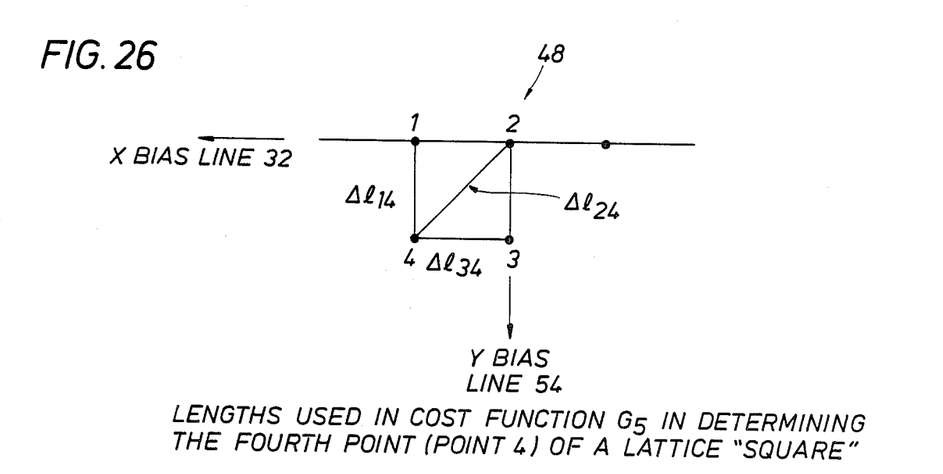
FIG. 26 is a graphical representation which shows the lengths used in a cost function for determination of a grid point used to complete a lattice square.

Before the second point on the y bias line 54 is determined, an entire "row" of grid points forming x' bias line 56, for example adjacent to the X bias line 32, is determined. Referring to FIG. 26, these points are determined by minimizing the function $$G_5 = G_5(x) = \left[ \left( \frac{\Delta l_{14}}{SD} - 1 \right)^2 + \left( \frac{\Delta l_{34}}{SD} - 1 \right)^2 + \right. \quad (20)$$

$$\left. \left( \frac{\Delta l_{24}}{\sqrt{2}\ SD} - 1 \right)^2 \right]$$

where $\Delta l_{14}$, $\Delta l_{34}$, $\Delta l_{24}$ are shown in FIG. 26.

$$x^T = [s_4\ t_4]$$
$$= \text{parameter values of the point to be determined.}$$

The derivatives of $G_4$ and $G_5$ with respect to x are given as follows:

$$G_4 = \left\{ \left( \frac{\Delta l_{04}}{\sqrt{2}\ SD} - 1 \right)^2 + \left( \frac{\Delta l_{14}}{SD} - 1 \right)^2 + \left( \frac{\Delta l_{24}}{\sqrt{2}\ SD} - 1 \right)^2 \right\}$$

Each time $G_4$ is minimized, a pair of s,t parameter values are obtained to determine a point on the y axis. Denoting the values to be determined by $s_4$ and $t_4$, the derivatives become:

$$\frac{\partial G_4}{\partial s_4} = 2 \left\{ \frac{1}{\sqrt{2}\ SD} \left( \frac{\Delta l_{04}}{\sqrt{2}\ SD} - 1 \right) \frac{\partial}{\partial s_4}(\Delta l_{04}) + \right.$$

$$\frac{1}{SD} \left( \frac{\Delta l_{14}}{SD} - 1 \right) \frac{\partial}{\partial s_4}(\Delta l_{14}) +$$

$$\left. \frac{1}{\sqrt{2}\ SD} \left( \frac{\Delta l_{24}}{\sqrt{2}\ SD} - 1 \right) \frac{\partial}{\partial s_4}(\Delta l_{24}) \right\}$$

$$\frac{\partial G_2}{\partial t_4} = 2 \left\{ \frac{1}{\sqrt{2}\ SD} \left( \frac{\Delta l_{04}}{SD} - 1 \right) \frac{\partial}{\partial t_4}(\Delta l_{04}) + \right.$$

$$\frac{1}{SD} \left( \frac{\Delta l_{14}}{SD} - 1 \right) \frac{\partial}{\partial t_4}(\Delta l_{14}) +$$

$$\left. \frac{1}{\sqrt{2}\ SD} \left( \frac{\Delta l_{24}}{\sqrt{2}\ SD} - 1 \right) \frac{\partial}{\partial t_4}(\Delta l_{24}) \right\}$$

The derivatives of $\Delta l$ with respect to s and t are computed using Equations 16 and 17 as before.
The derivatives of $G_5$ are obtained as follows:

$$G_5 = \left\{ \left( \frac{\Delta l_{14}}{SD} - 1 \right)^2 + \left( \frac{\Delta l_{34}}{SD} - 1 \right)^2 + \left( \frac{\Delta l_{24}}{\sqrt{2}\ SD} - 1 \right)^2 \right\}$$

As in the case of $G_4$, minimization of $G_5$ results in defining variables $s_4$ and $t_4$. Therefore, $$\frac{\partial G_5}{\partial s_4} = 2\left\{ \frac{1}{SD}\left(\frac{\Delta l_{14}}{SD} - 1\right)\frac{\partial}{\partial s_4}(\Delta l_{14}) + \right.$$

$$\frac{1}{SD}\left(\frac{\Delta l_{34}}{SD} - 1\right)\frac{\partial}{\partial s_4}(\Delta l_{34}) +$$

$$\left. \frac{1}{\sqrt{2}\,SD}\left(\frac{\Delta l_{24}}{\sqrt{2}\,SD} - 1\right)\frac{\partial}{\partial s_4}(\Delta l_{24}) \right\}$$

$$\frac{\partial G_5}{\partial t_4} = 2\left\{ \frac{1}{SD}\left(\frac{\Delta l_{14}}{SD} - 1\right)\frac{\partial}{\partial t_4}(\Delta l_{14}) + \right.$$

$$\frac{1}{SD}\left(\frac{\Delta l_{34}}{SD} - 1\right)\frac{\partial}{\partial t_4}(\Delta l_{34}) +$$

$$\left. \frac{1}{\sqrt{2}\,SD}\left(\frac{\Delta l_{24}}{\sqrt{2}\,SD} - 1\right)\frac{\partial}{\partial t_4}(\Delta l_{24}) \right\}$$

The minimization of $G_5$ ensures that the lattice 38 is as close as possible to the square with sides equal to the separation distance 50, 50A. The starting point parameter values for the optimization function in this case are obtained as $$s_4 = s_1 + s_3 - s_2$$

$$t_4 = t_1 + t_3 - t_2.$$

Figure 27:
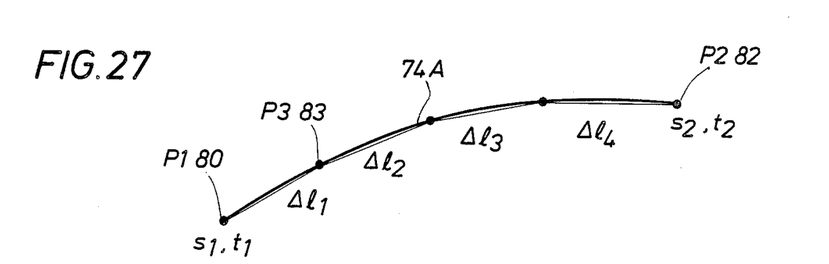
FIG. 27 is a graphical representation which shows the lengths used to calculate an arc segment between two points P1 80, and P2 82.

Referring now to FIG. 8 and FIG. 27, mathematical calculations are also used for the determination of the arc segment 74A as follows:

Let $(s_1, t_1)$ and $(s_2, t_2)$ be the parametric values of the two points P1 80 and P2 82 on the surface 28A and curve 74A represents the shortest distance between them as shown in FIG. 27.

Typically, the curve is divided into 4 segments and the length $\Delta l_i$ of each segment is computed as the straight line distance between two points P 180, P 383 for example, as follows:

$$\Delta l_i = (\Delta x_i^2 + \Delta y_i^2 + \Delta z_i^2)^{\frac{1}{2}} \quad (21)$$

where $$\Delta x_i = (x_i - x_{i-1})$$

$$\Delta y_i = (y_i - y_{i-1})$$

$$\Delta z_i = (z_i - z_{i-1})$$

and x, y, z are the Cartesian coordinates of the point under consideration.

The length $\Delta l$ between $P_1$ and $P_2$ is the sum of the individual line segments $\Delta l_1 - \Delta l_4$. It may be noted that more subdivisions would result in better accuracy, but round-off errors have to be considered as well.

The predicted results of the method of the present invention are presented in FIG. 3, FIG. 3 being a graphical representation of a computer display generated by a program Patran which may be purchased from PDA Engineering, 1650 Brookhollow Drive, Santa Ana, CA 92705-5475.

The output from the mathematical calculations used in the method may also be used to generate a ratio of actual spacing in the x direction between two adjacent fiber bundles 20 and the separation distance 60 at each grid point 40, the ratio of actual spacing in the Y bias line direction, and the sum of the absolute value of deviation of the angles at each corner of a lattice "square" from 90 degrees. This information indicates how much the original square configuration has sheared to assume a parallelogram shape. A computer may also use the mathematical output to generate the desired perimeter of the flat fabric. The outline thereafter may be placed directly upon the fabric to show where to cut the fabric.

Many other variations and modifications may be made in the apparatus and techniques herein before described, both by those having experience in the technology, without departing from the concept of the present invention. Accordingly, it should be clearly understood that the apparatus and methods depicted in the accompanying drawings and referred to in the foregoing descriptions are illustrative only and are not intended as limitations on the scope of the invention.

What is claimed is:

1. A method for covering a surface with a section of fabric having fiber bundles, said method comprising:
   defining the shape of said surface and boundary thereof;
   defining the shape of a lattice to represent said defined shape of said surface;
   defining a flat pattern having a perimeter by referencing said lattice;
   shaping said fabric to the shape of said flat pattern; and
   covering said surface with said shaped fabric.

2. The method of claim 1 wherein the step of defining the shape of said surface and boundary thereof further includes calculating the metrical properties of said shape by use of Bezier equations.

3. The method of claim 1 wherein the step of defining the shape of a lattice to represent said defined shape of said surface further includes the steps of:
   defining an X bias line in said lattice coinciding with the desired direction of fiber bundle orientation across said surface;
   defining grid points in said lattice positioned in spaced relation to said X bias line, each grid point separated from each adjacent grid point by a separation distance approximately equal to the distance between said fiber bundles; and
   confining said lattice defined by said grid points within the boundary of said defined shape of said surface.

4. The method of claim 3 wherein the step of defining an X bias line in said lattice coinciding with the desired direction of fiber bundle orientation across said surface further includes the steps of:
   defining the direction of the X bias line by specifying the parameter values of the end points of sais X bias line; and
   defining a curve connecting the endpoints of the X bias line, by minimizing the distance between the X bias line endpoints.

5. The method of claim 3 wherein the step of defining grid points in said lattice positioned in spaced relation to said X bias line, each grid point separated from each adjacent grid point by a separation distance approximately equal to the distance between said fiber bundles, further includes the steps of:

defining grid points along the X bias line by dividing the length of said X bias line into segments of equal separation distance length;

determining the first grid point on a Y bias line defined in said lattice relative to said X bias line;

defining an X' bias line through a row of grid points positioned adjacent the X bias line, one of said grid points being said first grid point on said Y bias line;

defining additional grid points on said Y bias line; and     defining additional X' bias lines, each of said additional X' bias lines containing one of said additional grid points defined on said Y bias line so as to extend said grid points a specified amount beyond the boundary of said defined shape of said surface.

6. The method of claim 3 wherein the step of confining said lattice defined by said grid points within the boundary of said defined shape of said surface further includes the steps of:

examining each pair of adjacent grid points to determine if the grid points straddle a boundary of said defined shape of said surface;

defining a line element between two grid points that straddle a boundary;

defining a lattice end point at the intersection of said line element and said boundary; and     redefining said lattice within said lattice end points.

7. The method of claim 1 wherein the step of defining a flat pattern having a perimeter by referencing said lattice further includes the steps of:

computing the length of each bias line between said lattice end points;

generating a flat pattern having straight lines, each of said straight lines having lengths equal to the computed lengths of each of said bias lines, said straight lines separated by said separation distance and having flat pattern end points; and     connecting said flat pattern end points of said straight lines by arc segments to define a flat pattern having a shaped perimeter.

8. The method of claim 1 wherein the step of shaping a portion of said fabric equivalent to the shape of said flat pattern further includes the steps of:

covering said fabric with said flat pattern;

orienting said flat pattern over said fiber bundles of said fabric so as to coincide a flat pattern straight line with said fiber bundle orientation; and     cutting said fabric so as to duplicate the flat pattern perimeter overlaid upon said fabric.

9. The method of claim 1 wherein the step of covering said surface with said shaped fabric further includes the step of orienting said fiber bundles of said fabric in the desired direction across said surface.

* * * * *